United States Patent

[11] 3,588,597

[72] Inventor Ellsworth M. Murley, Jr. Toledo, Ohio
[21] Appl. No 846,555
[22] Filed July 31, 1969
[45] Patented June 28, 1971
[73] Assignee Owens-Illinois, Inc.

[54] HIGH POWER SQUARE WAVE SUSTAINING GENERATOR FOR CAPACITIVE LOAD GAS DISCHARGE PANELS
11 Claims, 2 Drawing Figs.

[52] U.S. Cl. 315/169, 315/163, 315/238, 315/174
[51] Int. Cl. H05b 41/24
[50] Field of Search 315/160—173, 250—257, 238

*Primary Examiner*—John Kominski
*Attorneys*—E. J. Holler and Donald K. Wedding

ABSTRACT: There is disclosed a high power square wave sustaining generator system for a gas discharge panel particularly of the type in which discharge sites in a thin gaseous discharge medium confined in a space between a pair of dielectric charge storage members are defined by a pair of matrix conductor arrays. Thyristor pairs are series connected across a high direct current voltage potential source with an intermediate point between the thyristor pair being connected to conductors of one of the arrays. A second thyristor pair is series connected across a second source of high voltage direct current potential of opposite polarity to that of the first source A free-running multivibrator operating at double the desired frequency of output of square waves has its output divided by a bistable flip-flop circuit and two output voltages (each the complement of the other) from the flip-flop are fed to one-shot multivibrators and the output of the one-shot multivibrators are used as control or trigger potentials for the gate electrodes of the thyristors. Such control potentials are applied as trigger potentials to the gate electrode of one thyristor of a pair to cause it to conduct and a blocking potential is applied to the gate electrode of the other of the thyristors to maintain it nonconductive whereby current flows from the first high voltage source to the capacitive load through the conductive thyristor and on application of a trigger potential to the second thyristor of the pair and a blocking potential to the formerly conducting thyristor, the second thyristor of the series pair is caused to conduct thereby discharging current from the load. The other conductor array of the pair is supplied with square wave potentials in a similar manner but of opposite polarity. Transformers having double secondaries are used to simultaneously supply trigger potentials to the gate electrodes of the thyristors which are desired to be conductive to thereby supply charging current to the panel and a blocking potential to the gate electrode of the other thyristors to render them nonconductive. A protection circuit is also provided in the event both thyristors of a series pair are rendered conductive at the same time. In addition, there is disclosed a series lossy inductor in the circuit to the conductor arrays to limit peak current and ringing currents to the load. Consult the specification for other features and details.

INVENTOR
ELLSWORTH M. MURLEY

BY E. J. Holler & D. K. Wedding
ATTORNEYS

INVENTOR
ELLSWORTH M. MURLEY

BY E. J. Holler & D. K. Wedding
ATTORNEYS

HIGH POWER SQUARE WAVE SUSTAINING GENERATOR FOR CAPACITIVE LOAD GAS DISCHARGE PANELS

REFERENCE TO RELATED APPLICATIONS

In use this application is related to applicant's application Ser. No. 755,930, filed Aug. 22, 1968 for a "Solid State Multiphase High Voltage Generator."

SUMMARY OF THE INVENTION

This invention relates generally to high voltage high power square wave generators for supplying sustaining potentials to a pair of conductor arrays on a capacitive load gas discharge panel.

Capacitive load gas discharge panels of the type with which the present invention is concerned require sustaining voltages of the periodic character to be applied to opposing or orthodonally related conductor arrays, the cross points of which define or locate discharge sites in a gaseous discharge medium which is confined between a pair of opposing dielectric charge storage members. These discharge sites are selectively turned on and off and, at least in the on condition are maintained by the sustaining voltage applied to the conductor arrays. In even relatively small panels, as for example a 4 inch square display area, in which the conductors in the conductor arrays are spaced at from about 30 to 40 units per linear inch, there may be 17,000 or more discharge sites or units which, along with their characteristic nonlinear impedance, presents a very unusual load for the sustaining generator. Because such panels are essentially a capacitive load and when one or more sites in the gaseous medium are conditioned to be on, a surge current must be supplied by the sustaining generator and the magnitude of the surge current depends on the number of discharge sites or units which are on. With a sine wave drive, as disclosed in my above-identified Pat. application, the surge current may reach 1 ampere for a 4 inch panel. However, 2 amperes of surge current have been measured for square wave sustaining voltage drives. Such large current surges can produce notch distortions in the waveforms and to minimize such distortions the output impedance of the sustaining generators must be kept very low. Notch distortion affects the shape of the address pulse and consequently the turn on/off characteristics of a panel is altered as the notch changes shape due to loading.

With respect to power requirements, neon-argon panels operating in the 50 kHz. range (using sine waves) has a duty cycle of about 10 percent so as a rule of thumb, the peak power required by a panel (16 square inch display area) will run about 10 times the average power so the sustaining generator must be capable of supplying the peak power to a panel for small fraction of a cycle if notch distortion (and attendant alteration of operating characteristics) is to be minimized. Since gas discharge panels of the type with which the present invention is designed to be utilized, discharges are momentary, being extinguished or terminated during a half cycle of applied periodic potential by the storage of charges on the charge storage dielectric members, when the frequency of such discharges is in the 40 to 50 kHz. range, the number of light pulses produced is in the range from 80 to 100,000 pulses per second. When the frequency of such discharges is raised above this level, there is an attendant increase in operating temperature which may lead to thermal shock so the operating frequency is limited to about 40 kHz. and a sustaining generator which supplies about 15 watts average power and 150 watts peak is safe for use with present neon-argon panels.

For presently available neon-argon gas panels, the sustaining generator is required to supply about 320 to 400 volts peak-to-peak to the conductors in the array to achieve a proper sustaining voltage across the gas in the discharge gap. Neon-nitrogen panels require 400 to 1,200 volts peak-to-peak from the sustaining generator and the present invention can be used to drive neon-nitrogen filled panels. The above figures have been observed with sine waves sustaining voltages. There is evidence that square wave sustaining voltages may allow a lower sustaining voltage signal level. Thus, even though there is an increase in current requirements for square wave drives, there is a lowering of the voltage requirement.

The frequency of the sustaining voltage determines the brightness of the gas discharge. This is so because an increase in the slope of the voltage wave, from frequency increase, allows more charge to be transferred and the increased charge makes the individual discharges brighter. Brighter individual discharges coupled with the fact that the number of discharges per unit time is directly related to frequency, make the brightness of a discharge change very noticeably with frequency. However, square wave drives produce a much brighter discharge for the same frequency as a sine wave discharge because there seems to be more charges produced during ionization because of the very fast rise and fall times of the signal. A panel driven by a 38 kHz. square wave generator appears to the eye as being at least twice as bright as the same panel driven by a 50 kHz. sine wave.

In accordance with the present invention, series connected thyristor pairs are utilized as the main drive element for the square wave generator. These devices are capable of blocking several hundred volts and, when turned on, will withstand several hundred amperes surge current. The control gates of thyristors are very sensitive and can be controlled by very low level signals. However, care must must be taken with respect to two characteristics of thyristors which can limit their use in a square wave sustaining generator. These are the *dv/dt* effect and turnoff time. With respect to the former, if a voltage is applied across a thyristor too rapidly, enough of the voltage is internally coupled to the gate electrode by stray capacitance to turn the device on and hence this effect limits to rise time of an output voltage of a sustainer using thyristors in its output circuit.

With respect to turnoff time, when a positive voltage is applied to the gate circuit of a thyristor, the thyristor turns on and allows the battery to charge the capacitance of the load (the gas discharge panel). The thyristor will remain on or shorted as long as the anode current remains above a prescribed minimum sustaining level. When the anode current drops below its minimum sustaining level, the gate will recover control after a specific time delay and this time is known as the turnoff time and limits the frequency which a thyristor can be switched.

Both *dv/dt* and turnoff time effects are temperature sensitive and both can be minimized somewhat by negative gate biases. In accordance with the invention, simultaneously with the application of a trigger potential to the gate electrodes of one of the thyristors of a series connected thyristor pair, a blocking potential is applied to the gate electrode of the other thyristor to render one of the thyristors conductive and maintain the other nonconductive to permit a current to flow from a high voltage direct current source through the conducting thyristor. On the negative half cycle, a trigger potential is applied to the gate electrode of the other thyristor of the pair and a blocking potential is applied to the gate the formerly conductive thyristor so that the charge on the load is permitted to discharge through the conductive thyristor. An opposite polarity arrangement is utilized for supplying similar square wave potentials to the other conductor array in the gas discharge panel. Transformers having auxiliary secondary windings are utilized for supplying the trigger and blocking potentials to the thyristors. In addition, a series lossy inductor is utilized on the output terminals to the panel to limit the peak and ringing currents to the load. Moreover, if for some reason both thyristors are turned on at the same time, a short circuit would appear across the high voltage direct current power supply with resulting damage to the system if the short is not removed fairly rapidly. An automatic recovery circuit is provided for insurance against this occurrence. This automatic recovery circuit includes a relay coil, a resistor and capacitor in parallel all of which are hooked in series with the high voltage supply lines to the series connected thyristor pair. Normally closed contacts of the relay are also connected in series with the line to the thyristors. Under normal operations, the voltage drop across the resistor is not enough to operate the relay. However, if both thyristors should turn on at the same time, the voltage drop across the relay coil will open the relay contact and remove the voltage long enough for the thyristor gates to recover control. The capacitor in parallel with the resistor and coil offers a low impedance to the thyristor circuit.

DESCRIPTION OF THE DRAWINGS

The above and other objects, advantages and features of the circuit will become more apparent from the following specification taken in conjunction with the accompanying drawings wherein.

DESCRIPTION OF A PREFERRED EMBODIMENT

Figure 1:
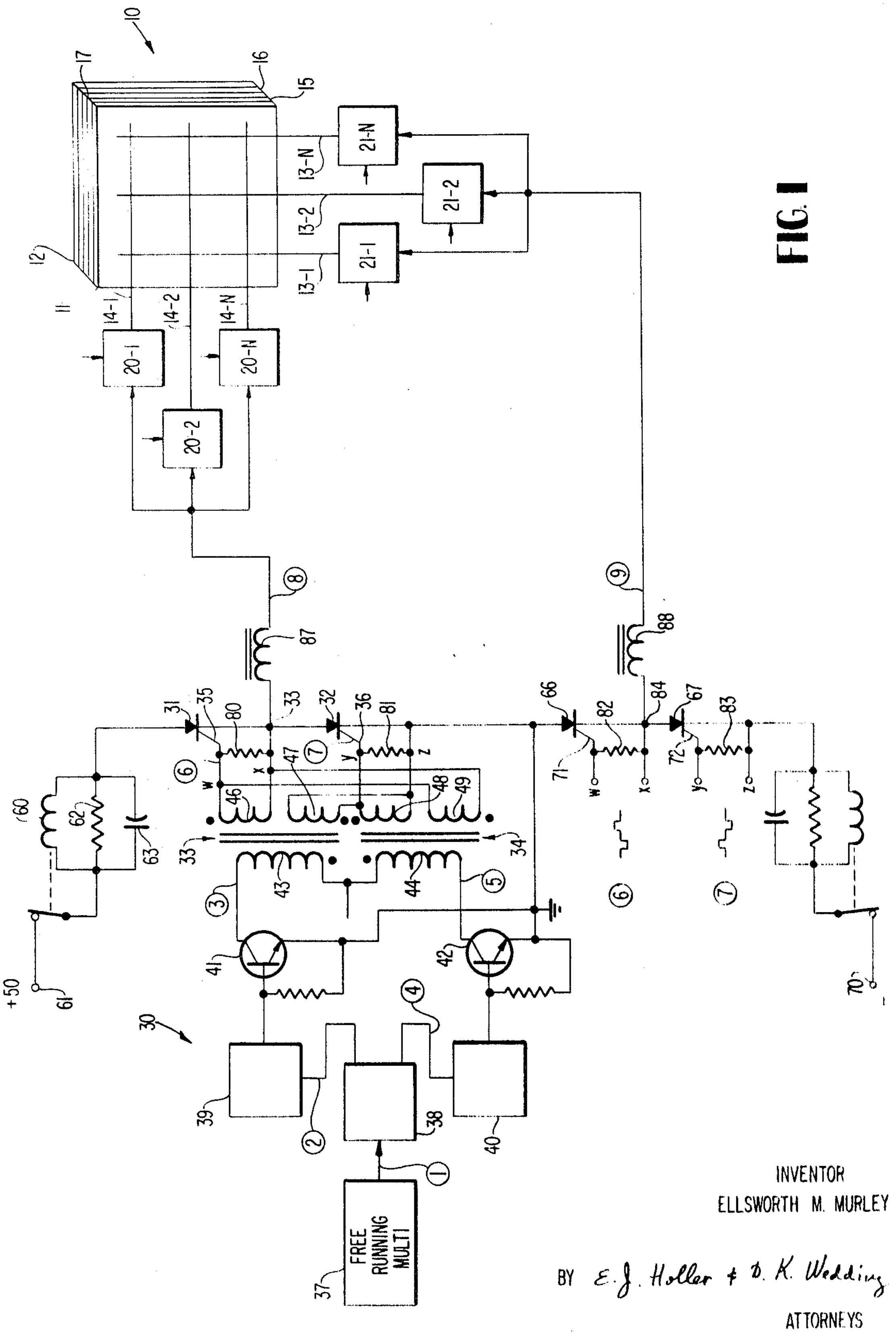
FIG. 1 is a schematic block diagram of a sustaining voltage supply system incorporating the invention and FIG. 2 illustrates typical voltage and current wave forms of the generator.

With reference to FIG. 1 of the drawing, a capacitive load gas discharge panel is constituted by a pair of support or plate members 11 and 12 (usually glass), which have on opposing or facing surfaces thereof conductor arrays 13 and 14, respectively, cooperatively defining discharge site locations in a thin gas volume between a pair of thin dielectric members 15 and 16, respectively. Within the panel 10, dielectric members 15 and 16 separate the conductors from the gas and the opposing or facing surfaces of the dielectric-gas interface serve as storage means for charges produced during discharge of the gas. Plate member 11 is joined to plate member 12 in spaced relation by spacer sealant member 17. As described above, the opposing surfaces of thin dielectric members 15 and 16 constitute at least in part a portion of storage members forming walls of a thin gas chamber under about 10 mils thick, and preferably, the opposing surfaces of thin dielectric members 15 and 16 are spaced apart about 4 to 6 mils so that the gas volume and, accordingly the discharge gap is 4 to 6 mils. Transversely oriented conductor arrays 13 and 14 are supplied with operating potentials for selectively effecting discharges within the thin gas chamber between selected cross points or matrix points of a pair of the conductors of each array and sustaining and terminating discharges once initiated. The gas is one which is under a relatively high gas pressure so as to localize the discharges within the chamber and to confine charges produced on discharge to within the volume of gas in which they are created. The gas in the thin gas chamber has a breakdown voltage versus pressure-time-discharge gap distance which is relatively horizontal over a selected broad range or gas pressure and, is a mixture of neon and argon gases.

Charges produced on discharge of the gas at selected discharge sites are collected upon the discrete dielectric surface therein of dielectric member 15 and 16 and in effect such stored charges constitute electric potentials opposing the potentials which created them and hence terminate the discharge. However, on succeeding half cycle of applied sustaining potential, the potential of the stored charges, being in the same direction, aid and participate in initiating the next discharge and hence constitute an electrical memory. Because of the gas being at a relatively high pressure and separated from the operating conductors of the arrays by dielectric material, relatively high periodic alternating potentials are required in order to sustain discharges once initiated. At the present time, typical sustaining voltage for a neon-argon panel lies within the rank of 335 to 350 volts peak-to-peak and at a frequency or rate of from about 30 to 50 kHz. with two microsecond high voltage pulses superimposed or added to the sustaining voltage to manipulate the discharge condition of selected discharge sites. The normal magnitude of pulse potential required to initiate a discharge (assuming, of course, has been conditioned by ultraviolet or other means as is usual with such panels) is about the same as the sustaining potential.

Normally, voltages from a computer or standard commercially available logic circuitry (not shown) is in the neighborhood of 4 volts and such low voltages are translated to high voltage discharge manipulating pulses by interface circuits 20–1, 20–2 ... 20–*n* for row conductors 14–1, 14–2 ... 14–*n*, respectively, and 21–1, 21–2 ... 21–*n* for column conductors 13, such low voltage pulses being selectively applied as indicated by arrows to the interface circuits 20 and 21. It will be appreciated that panel 10 will usually have many more conductors in conductor arrays 13 and 14; presently available panels having the conductors on 30 mil centers so that in a 4 inch display area in a panel there may be about 132 row conductors and a 132 column conductors.

The present invention is concerned with improvements in the sustaining generator source for supplying square wave sustaining potentials to the conductor array.

In general, the generator includes a driver stage 30, series connected thyristor pair 31 and 32 and a pair of transformer means 33 and 34 for applying control potentials to the gate electrodes 35 and 36 of thyristors 31 and 32, respectively.

With respect to the driver section 30, it includes a free running multivibrator 37 tuned to double the desired generator frequency (FIG. 2 waveform 1) (or an even multiple thereof). The signal from free running multivibrator 37 is to a JK flip-flop 38 which is connected as a T flip-flop to divide the frequency by two FIG. 2 waveforms 2 and 4) (or to the desired frequency). The outputs (which are the complements of each other) from flip-flop divider 38 are applied to one shot multivibrators 39 and 40, respectively. On each positive input to one shot multivibrator circuits 39 and 40, respectively, there is produced at the outputs thereof one microsecond pulses which are applied to the base electrodes of driver transistors 41 and 42, respectively which produce the 1 microsecond pulses (waveforms 3 and 5 of FIG. 2). These output voltages (waveforms 3 and 5 of FIG. 2) alternately activate or energize transformers 33 and 34 in the output section of the driver 30 and serve primarily to isolate the thyristor gate circuits from the low voltage integrated circuits. Primary winding 43 of transformer 33 is connected to receive pulse signals from driver transistor 41 whereas primary winding 44 of transformer 34 is connected to receive pulsing signals from driver transistor 42. Preferably, each transformer 33 and 34 has a pair of secondary windings, the secondary windings of transformer 33 being designated by the numeral 46 and 47 whereas the secondary windings of transformers 34 are designated by the numerals 48 and 49 with the polarities of each transformer secondary being as indicated on the drawing. When a pulse arrives at the primary of transformer 33, a pulse is generated on each of secondary windings 46 and 47, one a positive pulse and the other a negative pulse. The positive pulse is fed to the gate electrode 35 of thyristor 31 and the negative pulse is fed to the gate electrode 36 of thyristor 32. This action triggers thyristor 31 in its conductive state and charges the panel capacitance to the high voltage from source 50 which is a positive voltage. After the charging current to the panel falls below the minimum sustaining level for the thyristor, thyristor 31 returns to its blockage state. The negative pulse as generated by transformer secondary 47 is applied to gate electrode 36 of thyristor 32 to enhance the $dv/dt$ and turn on/off time characteristics of the thyristor. This negative pulse also minimizes false triggering from spurious pulses.

Sometime after thyristor 31 returns to its blocking state, a pulse arrives at transformer primary 44 which transmits a negative pulse, as generated by secondary winding 49, to the control gate 35 of thyristor 31 and a positive pulse is generated in secondary winding 48 which is applied to the control gate electrode 36 of thyristor 32. This action drives thyristor 32 into its conducting state which is in effect a short across the panel capacitance and returns the panel to ground potential. This alternate action of the thyristor switches the panel sustaining potential between the high positive potential from source 50 and ground. The output point 53 intermediate the anode point of thyristor 32 and the cathode of thyristor 31 serves as the output point for the square wave sustaining voltages to be applied to conductors 14–1, 14–2, ... 14n in conductor array 14 through interface circuits 20–1, 20–2 ... and 20n.

A lossy inductor 87 consisting of about 8 turns of number 22 or 20 wire toroidally wound on a Ferroxcube type 2213P-L00-3B7 core is placed between point 53 in the thyristor circuit and the capacitive load, namely the panel. The same result can be achieved by ferrite beads on the output conductor to the load. The lossy inductor serves to limit the current application rate to the load which tends to reduce the junction heating and reduces thermal effects of *dv/dt* and turnoff time is enhanced.

Also shown in FIG. 1 is an automatic short circuit protection circuit which is used with the thyristor pulser circuit. Since, if by accident, both thyristors 31 and 32 conduct simultaneously, they will short circuit the power supply 50 and burn out either the thyristors or the power supply. This automatic protection circuit includes a single-pole double-throw relay 60 (about 6 volts) having a normally closed switch element 61, a dropping resistor 62 (about 10 ohms) and a capacitor 63 (about 350 microfarad) all connected in parallel and connected in series between the thyristor 31 and 32 and the high voltage B+ supply 50. Relay coil 60 is a voltage responsive relay such that the voltage drop across the relay coil and the resistor will not activate the relay with normal operating currents flowing through the circuit. If both thyristors 31 and 32 should conduct simultaneously, the surge current will open the relay contact 61 to momentarily drop the anode current and allow the control gates 35 and 36 to recover control of thyristors 31 and 32, respectively. The voltage drop across the circuit is less than one volt for a 4-inch gaseous discharge display panel 10.

The lower left-hand portion of FIG. 1 discloses a second high power square wave generator which produces square wave voltages which are the complements of the square wave voltages produced by thyristors 31 and 32. In this way, one-half of the sustaining voltage ($V_s/2$) is applied to the conductors of conductor array 14 and the other half of the voltage ($V_s/2$) is applied to the conductors of conductor array 13.

Figure 2:
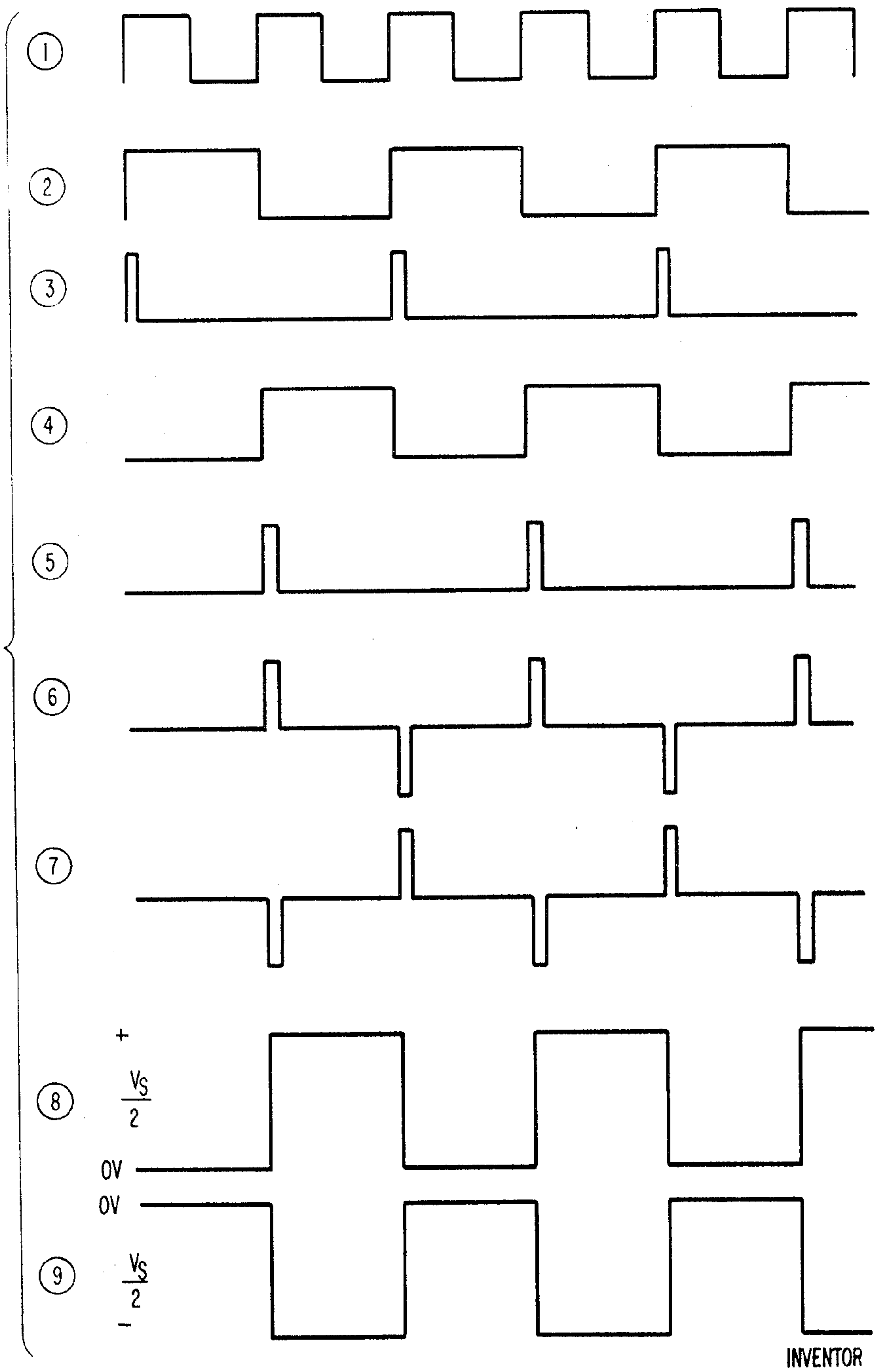

Thus, the second half of the sustaining voltage system shown in FIG. 2 includes a second pair of thyristors 66 and 67 which are connected in series, anode of thyristor 67 being connected to the cathode of thyristor 66 to serve as an intermediate point or output terminal 84 connected to the conductor in conductor array 13. It will be noted that high voltage supply 70 is negative with respect to ground and source 50 and that the thyristors are poled in the direction to accommodate this polarity. Control voltages to control or gate electrodes 71 and 72 for thyristor 66 and 67 respectively are supplied by connecting points *w-x* to points *w-x* on transformer secondary 46 to supply square wave operating potentials to the gate electrode 71 and points *y-z* are connected to points *y-z* on the secondary winding 48 of transformer 34. In this way, the necessary synchronism between the pulsing of the square wave applied to the conductors of conductor array 13 and the conductors of conductor array 14 is thereby achieved. However, if desired, a separate thyristor drive circuit similar to the one illustrated may be used to drive thyristor pair 66 and 67, provided the necessary synchronism is maintained.

The upper frequency limit of the thyristor generator circuit is determined by the turnoff time of the thyristor. The turnoff time varies according to thyristor type but is typically of the order of 10 to 20 microseconds. When a safety factor is applied, the upper frequency limit is 30 to 40 kHz. with radar modulator type thyristors (MCR 1336–6).

Not only do gate characteristics of thyristors vary from type to type, but vary widely within a certain type as well. Furthermore, the gate characteristics may be somewhat temperature sensitive. Variations in gate sensitivity can be compensated for by changing the low value (22 ohms) resistor 80, 81, 82 and 83, which shunt the thyristor gate electrodes 35, 36, 71, and 72, respectively. In some cases, it may be necessary to modify the turns ratio on the pulse transformers 33 and 34. The standard transformer (33 and 34) consists of a 30 turn primary and dual 60 turn secondaries wound on a Ferroxcube type 1811–T–00–387 core. When modifying the gate circuit to suit a particular thyristor type, the gate circuit impedance should be kept as low as practical for good performance. The pulse width at the gate should be about 1 microsecond to insure the thyristor is full on at the time of a discharge in the panel.

The rise time of the voltage waveform is about 700 nanoseconds for a 4-inch panel load but faster or slower rate rise times may be utilized to reduce radiation and capacitive coupling within the addressing system.

The very large current pulses coupled with stray inductance in the output lines causes ringing in both current and voltage waveforms when the generator is connected to a capacitive load such as a gas discharge panel. Ringing can be minimized or eliminated by decoupling the B+ supply and stringing ferrite beads on the output lines as illustrated by the inductances 87 and 88.

Summarizing the advantages of square wave drives for capacitive load discharge panels, square wave sustaining generators, using semiconductors in the switching mode, are very efficient because when they switch between cutoff and saturation, they switch from one power consumption minimum to another. Capacitive load gas discharge panels driven by square waves are much brighter for a given frequency and voltage than those driven by sine waves.

I claim:

1. A system for supplying square wave sustaining potentials to transversely related conductor arrays in a capacitive load type gas discharge panel comprising, a first high voltage unidirectional current source, a second high voltage unidirectional current source, there being a point of reference potential common to said sources, a first pair of normally open switch means connected in series across said first high voltage source and having a point intermediate said pair of switches connected to one of said conductor arrays, a second pair of normally open switch means connected in series across said second high voltage source and a point intermediate said second pair of switches being connected to the other one of said conductor arrays, a switch control means for controlling the alternate closing and opening of said switch means whereby said first and said second high voltage sources are first connected to said conductor arrays respectively, to supply charging current thereto and secondly to said point of reference potential common to said sources to discharge said conductor arrays.

2. The invention defined in claim 1 wherein said switch means are thyristors.

3. The invention defined in claim 2 wherein said switch control means includes means for applying pulse potentials to gate electrodes of said thyristors.

4. The invention defined in claim 3 wherein said switch control means includes means for applying trigger pulse potentials to one gate electrode of each pair of series connected thyristor pair and a blocking pulse potential to the other gate electrode of each series connected pair.

5. The invention defined in claim 4 wherein the last named means includes a transformer means having a pair of oppositely wound secondaries.

6. The invention defined in claim 5 wherein said transformer means includes a pair of transformer primary windings, each primary winding being inductively coupled to its associated pair of secondary windings, means connecting a first secondary winding in which a blocking pulse signal is induced to the gate electrode of a thyristor of a pair, and means connecting a second of said secondary windings in which a trigger pulse potential is induced to the control electrode of the other, thyristor of a pair.

7. The invention defined in claim 1 including means on the connection between said points intermediate said pair of switches and said conductor arrays to limit surge and ringing currents.

8. The invention defined in claim 1 including control device responsive to simultaneous closing of both switches of a pair to open the circuit to said high voltage unidirectional current sources, respectively.

9. A high power square wave generator for capacitive load gas discharge panels, comprising:

a source of high voltage direct current potential having a pair of output terminals, a pair of thyristors each having anode, cathode and gate electrodes, means connecting the anode-cathode circuits of said thyristors in series circuit across said output terminals, with the anode of one of said thyristors connected to the cathode of the other of said thyristors to constitute an output terminal, means for simultaneously applying a trigger potential to the gate electrode of one of said thyristors and a blocking potential to the gate electrode of the other of said thyristors to render said one thyristors conductive and maintain the said other of said thyristors nonconductive, whereby current flows from said source to said capacitive load through the conductive thyristor and said output terminal, and means for simultaneously applying a trigger potential to the gate electrode of said other thyristor and a blocking potential to the gate electrode of said one thyristor so that said one thyristor is rendered nonconductive and said other thyristor is rendered conductive whereby discharge current from said capacitive load flows through said output terminal and said other thyristor.

10. The invention defined in claim 1 wherein said means for simultaneously applying trigger and blocking potentials to gate electrode of said thyristors includes, a free running multivibrator operating at a multiple of the desired frequency of output square waves, and divider means for deriving from the output of said free-running multivibrator a series of pulses equal to the desired frequency output.

11. A high power square wave sustaining voltage system for a gas discharge panel in which discharge sites in a thin gas discharge medium under pressure in a space between a pair of dielectric charge storage members are defined by a pair of matrix conductor arrays, comprising:

a first source of high voltage direct current voltage, a first pair of thyristors, each having a control electrode, an anode and cathode electrodes, means connecting the anode-cathode circuits of said thyristors in series across said first source, a second source of high voltage direct current voltage of opposite polarity from said first source, said sources having a point of common reference potential, a second pair of thyristors each having a control electrode and anode and cathode electrodes, means connecting the anode-cathode circuits of said second pair of thyristors in series across said second source, means connecting an intermediate point between said first pair of thyristors to a first of said pair of matrix conductor arrays, means connecting an intermediate point between said second pair of thyristors to the second of said pair of matrix conductor array, and means for applying switching potentials to control electrodes of said thyristors to cause the high voltage direct current sources to be simultaneously applied to said pair of matrix conductor arrays for a selected time interval and then to simultaneously connect said pair of matrix conductor array to said point of common reference potential.